United States Patent [19]

Wood et al.

[11] 4,273,913

[45] Jun. 16, 1981

[54] ISOCYANATE CAPPED URETHANE-CONTAINING PREPOLYMER PREPARED FROM POLYOLS OBTAINED FROM EPIHALOHYDRIN

[75] Inventors: Louis L. Wood, Rockville; Donald W. Larsen, Marriotsville, both of Md.

[73] Assignee: W. R. Grace & Co., New York, N.Y.

[21] Appl. No.: 103,248

[22] Filed: Dec. 13, 1979

Related U.S. Application Data

[63] Continuation-in-part of Ser. No. 23,912, Mar. 26, 1979, abandoned.

[51] Int. Cl.[3] .......... C08G 18/10

[52] U.S. Cl. .......... 528/77; 521/159

[58] Field of Search .......... 528/77

[56] References Cited

U.S. PATENT DOCUMENTS

| | | | |
|---|---|---|---|
| 3,222,300 | 12/1965 | Loew | 521/159 |
| 3,322,698 | 5/1967 | Wiles et al. | 521/169 |
| 3,374,204 | 3/1968 | Masters et al. | 528/77 |
| 3,415,902 | 12/1968 | Hickner et al. | 528/77 |
| 3,576,906 | 4/1971 | Hickner et al. | 528/77 |
| 3,746,692 | 7/1973 | Olstowski et al. | 528/77 |
| 3,784,601 | 1/1974 | Jellinek et al. | 528/77 |
| 3,828,005 | 8/1974 | Pittman | 528/77 |

*Primary Examiner*—Maurice J. Welsh

*Attorney, Agent, or Firm*—Richard P. Plunkett; William W. McDowell, Jr.

[57] ABSTRACT

The invention disclosed is for novel polyols and a method of making said polyols which comprises interconnecting polyols with epihalohydrin in the presence of substantially an equimolar amount of base based on the epihalohydrin thereby forming an extended polyol with terminal hydroxyl groups and at least one hydroxyl group attached directly to the backbone chain internally. These resultant polyols can be used to make polyurethane foams having high resiliency.

3 Claims, No Drawings

ISOCYANATE CAPPED URETHANE-CONTAINING PREPOLYMER PREPARED FROM POLYOLS OBTAINED FROM EPIHALOHYDRIN

This application is a continuation-in-part of our co-pending application having Ser. No. 23,912, filed Mar. 26, 1979, now abandoned.

BACKGROUND OF THE INVENTION

1. Field of the Invention

This invention relates to a new class of polyols. More particularly, the invention relates to chain-extending existing polyols with epihalohydrin in the presence of a base or alkali metal thereby forming an extended polyol with at least one internal hydroxyl group attached directly to the backbone chain.

2. Description of the Prior Art

It is well known to react polyisocyanates with polyols and, e.g., water, to form flexible polyurethane foams. For the most part, the polyols used in these reactions are triols comprising three backbone chains emanating from a central starter molecule such as glycerol or trimethylol propane and the like. These three chains are relatively uniform in structure and in chain length, each averaging about 1,000 to about 2,000 units of molecular weight. Such molecules can be viewed as comprising a long linear chain having a near centrally attached long chain branch, each leg of which bears a terminal —OH group, for example,

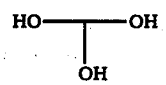

U.S. Pat. No. 3,322,698 discloses rigid cellular urethanes prepared by reacting in the presence of a blowing agent, an organic polyisocyanate and a polyether derived from the reaction of an epihalohydrin and at least one polyol of the formula:

$$HOCH_2—(CHOH)_n—CH_2OH$$

wherein n is 1 to 4. The polyether forming reaction is carried out in the presence of an acidic fluorine-containing catalyst, e.g., fluoboric acid, to obtain a polyether containing the group $$—CH—(CH_2X)—CH_2O—$$

wherein X is fluorine, chlorine or bromine.

U.S. Pat. No. 3,222,300 relates to forming cellular polyurethanes obtained by reacting an organic polyisocyanate with modified polyalkylene ether glycols. The polyalkylene ether glycols bearing solely terminal hydroxyl groups are formed by reacting at least one mole of epoxide or glycidyl ether with a mole of polyalkylene ether glycol.

The polyols of the instant invention have internal hydroxyl groups attached directly to the backbone and no halide present.

DESCRIPTION OF THE INVENTION

The instant invention is directed to a process of forming a chain-extended polyol composition containing at least three OH groups of the general formula:

$$(H—A_a)_x—B—A_b—\!\!\left[CH_2\overset{\displaystyle OH}{\overset{|}{C}}HCH_2—A_b—\overset{\displaystyle (A_a—H)_{x-1}}{\overset{|}{B}}—A_a\right]_z\!\!H$$

wherein A is $—\underset{R_1}{\underset{|}{C}}H(CH_2)_n\underset{R_2}{\underset{|}{C}}HO—$; B is selected from the group consisting of $H\overset{CH_2O—}{\overset{|}{\underset{CH_2O—}{\underset{|}{C}}}}—O—$, $R_3\overset{CH_2O—}{\overset{|}{\underset{CH_2O—}{\underset{|}{C}}}}—CH_2O—$, $—O—$ and $>NCH_2CH_2N<$;

at least one of $R_1$ and $R_2$ is H and the other is independently selected from the group consisting of H, $CH_3$ and phenyl; $R_3$ is H, $CH_3$, $CH_2CH_3$ or $—OCH_2—$; n is 0 or 2; x is 1–3; z is 1–10 and a and b are independently selected from 1 to 1000, which comprises reacting at a temperature in the range 50° to 120° C., preferably 90°–110° C. an epihalohydrin, a base and polyol independently selected from the formula:

$$(H—A_a)_x—B—A_bH$$

wherein the members A, B, a, b and x are as hereinbefore set forth, said epihalohydrin, base and polyol being present in a molar ratio of 1.0:0.9 to 1.2:1.1 to 4.0 respectively, removing the thus formed salt and thereafter recovering the thus formed chain-extended polyol.

Thus, by the practice of the instant invention, chain-extended polyols of varying lengths can be obtained depending upon the molar ratio of the starting polyol or polyols to the epihalohydrin. For example, when the molar ratio of polyol (P) to epihalohydrin (E) is substantially 2:1, the chain-extended polyol will have the general formula:

(P)-(E)-(P)

If the molar ratio is 3:2, the chain-extended polyol will theoretically have the general formula:

(P)-(E)-(P)-(E)-(P)

Additionally, it is possible to employ different polyols as reactants in the practice of this invention. That is one may use a polyol having substantially ethylene oxide units (PEO) in its backbone in combination with a polyol having substantially propylene oxide units (PPO) in its backbone. If the molar ratio of (PEO) to (PPO) to E is substantially 1:1:1, then the resultant chain-extended polyol will have the general formula:

(PPO)-(E)-(PEO)

Also, operable as starting materials are polyols which are, within themselves, a combination of different units such as a hydrophilic polyol containing at least 40 mole percent ethylene oxide units with the remaining 60 mole percent being another alkylene oxide such as propylene oxide.

The epihalohydrins used in the instant invention are of the formula:

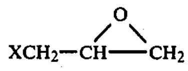

wherein X is fluorine, bromine or preferably chlorine. Such materials are commercially available. The epihalohydrin is used herein in an amount necessary to chain-extend the existing polyols in the presence of substantially a stoichiometric amount of base to react with the halide present in the epihalohydrin. The base used herein is preferably NaOH, but other well known alkaline bases, e.g., KOH, sodium methoxide, etc., are operable herein. In some instances it is preferred but not necessary to dissolve the base in an aqueous medium such as water prior to or during the mixing with the existing polyol for homogeneity of admixture. The water is then removed by conventional means prior to addition of the epihalohydrin to form sodium alkoxide. That is, the equilibrium of the reaction:

$$NaOH+ROH \rightarrow NaOR+H_2O\uparrow$$

wherein R is the remaining moiety of a polyol, is shifted to the right by removing water from the system. Any remaining hydroxide ion or water could hydrate the epihalohydrin or reaction intermediates to undesired products. Volatile alcohols in equilibrium with alkoxide salts are removed in the same manner.

Sodium or other alkali metals, which for the purpose of this invention are considered as bases herein, can also be used to convert the polyol directly to alkoxide with the evolution of hydrogen, thusly $$2Na+2ROH \rightarrow 2NaOR+H_2\uparrow$$

The existing polyols to be chain-extended by the practice of this invention can be formed in various ways to obtain diverse hydroxyl terminated materials. One method of forming a polyol is to add either singly or plurally, stepwise or random one or more alkylene oxides to a polyalcohol to produce a hydroxyl-terminated, polyether-containing polyol. Alkylene oxides operable for forming said existing polyols include, but are not limited to, ethylene oxide, propylene oxide, butylene oxide, styrene oxide and mixtures thereof. Polyalcohols reacted therewith to form the existing polyols include, but are not limited to, ethylene glycol, diethylene glycol, 1,4-butanediol, propylene glycol, glycerine, triethanolamine, dipropylene glycol, cyclohexane dimethanol, erythritol, sorbitol, sucrose, trimethylolpropane, 1,2,6-hexanetriol, pentaerythritol, tetrakis (hydroxyethyl) ethylenediamine, tetrakis (hydroxypropyl) ethylene diamine and mixtures thereof. Primary amines and polyamines such as n-butylamine, n-dodecylamine, ethylenediamine, propylenediamine and the like may also be used.

Another method of forming the existing polyols chain-extended in the instant invention is to react polybasic acids with polyalcohols with the concomitant splitting out of water during the ensuing esterification reaction. Polyalcohols used in this method essentially are the same as were enumerated above. Polybasic acids used in this method include, but are not limited to, adipic acid, maleic acid, succinic acid, oxalic acid, malonic acid, dimer acid, phthalic acid, trimellitic acid, pyromellitic acid and mixtures thereof. Also operable as polybasic acids are the corresponding anhydrides and acyl halides thereof.

The molar ratio of the epihalohydrin, base and polyol reactants is in the range 1.0:0.9 to 1.2:1.1 to 4.0 respectively, preferably 1.0:1.0:1.5 to 2.0.

The reaction can be carried out at pressures ranging from atmospheric to 50 psi, preferably at substantially atmospheric pressure at temperatures ranging from 50–120, preferably 90°–110° C. The reaction can be performed under atmospheric conditions, i.e., in air, but preferably the reaction is performed in the absence of oxygen under an inert blanket, e.g., nitrogen, to avoid oxidation of the existing or resultant chain-extended polyols.

The precipitated salt is removed by filtration, centrifugation or other conventional means. The product can then be treated with conventional ion exchange resins or clays having ion exchange capability to reduce soluble metal ions to an acceptable level. An organic solvent, e.g., acetone, toluene, ethyl acetate, may be added to facilitate filtration or treatment with ion exchange resin and is later stripped from the product.

In all examples of making the chain-extended polyol herein a round bottom flask equipped with heating mantle, stirrer, thermometer, gas inlet, gas outlet, vacuum line, addition funnel, distillation head with condensor, receiver and cold traps as needed was used.

The general preferred procedure of forming the chain-extended polyols is as follows. The polyol (z+1 moles) is melted, if necessary, weighed and charged to a reactor. The exact weight needed is calculated from the hydroxyl analysis of the polyol corrected for water content (K. Fisher analysis). Standardized aqueous base ((0.9 to 1.2) z moles) is added and all possible water is distilled from the starting material at 100°–110° C., 1 to 5 Torr in 1–2 hours. The vacuum is cut off and the reactor brought to atmospheric pressure with nitrogen. The epihalohydrin (z moles) is weighed and added to the polyol at 50°–120° C., pref. 90°–110° C. in 1–2 hours. Heating is continued until no more salt precipitates or the pH of a sample dissolved in water reaches a minimum value. Any excess epihalohydrin is stripped from the reaction product.

Salt is separated from the product by filtration or centrifugation. Solvent, exemplified by, but not limited to, toluene, acetone, ethyl acetate or chlorinated hydrocarbons can be added to lower the viscosity of the slurry to facilitate the separation. The salt is washed with solvent. The product solution is passed through a column of ion exchange resin or a clay with ion exchange capability to remove traces of alkali metal ion that would be undesirable if the polyol is to be used in making polyurethane products.

The following examples are set out to explain, but expressly not limit, the instant invention. Unless otherwise noted, all parts and percentages are by weight.

EXAMPLE 1

Preparation of Triol

Two kilograms (2 moles of commercially available polyethylene glycol MWt. 1000) containing 1.00 mole of sodium hydroxide in 150 ml of water was heated to 110° C. at 20 Torr with good stirring to remove all the water. To the resultant brown liquid, at 90° C., was added over a period of 45 minutes, 95 g (1.025 moles) of epichlorohydrin. The resultant liquid slurry containing a precipitate of sodium chloride was stirred for 2 hours at 90° C. The product had a pH of 7.0 as measured with moist, pHydrion® paper. To the product slurry was added 250 ml of water and the resultant mixture heated to 100° C. Saturated NaCl- brine solution separated from the product and was removed by decantation. The process was repeated again with 200 ml $H_2O$. The organic product liquid was stripped of water at 100° C. and 20 Torr with good stirring. The amber liquid was then filtered free of residual salt. The resultant product of the formula:

$$H-(OCH_2CH_2)_{23}-OCH_2\underset{}{\overset{OH}{\overset{|}{C}}}HCH_2-O-(CH_2CH_2O)_{23}-H$$

wherein 23 represents the average number of monomer units per poly(ethylene oxide) block, analyzed as follows:

0.3% $H_2O$ (K. Fischer), 0.33 meq OH/g
1.86 meq OH/g (acetic anhydride end group titration)
1.53 meq OH/g (corr. for $H_2O$), theory is 1.45

EXAMPLE 2

Preparation of Triol

To four kilograms of commercially available polyethylene glycol (MWt. 1000) were added 2.00 moles of sodium hydroxide in 300 ml of water. The water was removed from the resultant solution by heating to 100°-110° C. at 10 Torr for 1.5 hours with good stirring.

To the above dried liquid at 90° C. was added 190 g (2.05 moles) of epichlorohydrin over a period of 45 minutes. The reaction was stirred at 90° C. for 3 hours whereupon the pH (moist pHydrion® paper) was 7.0. 500 ml of water were added to the reaction mixture and stirred for 20 minutes at 100° C. The pH of the resulting brine phase was 6.0-6.5. Water was removed from the liquid product at 100°-110° C. and 10 Torr with good stirring for 2 hours. The resultant precipitate of sodium chloride crystals was allowed to settle out at 50° C. for several days and the liquid product was separated by decantation.

| | |
|---|---|
| Analyses: | |
| meq OH/g (via acetylation) | = 1.73 |
| $H_2O$ (Karl Fischer) | = 0.2% (0.22 meq OH/g) |
| 1.72-0.22 | = 1.51 (theory 1.45) |

EXAMPLE 3

Preparation of a Triol

To 1200 g (2 moles) of commercially available polyethylene glycol (MWt. 600) were added 1.02 mole of sodium hydroxide in 150 ml of $H_2O$. The water was then removed by heating at 110° C. and 20 Torr for 1.5 hours. To the resultant liquid at 100° C. and atmospheric pressure was added 97 g (1.05 m) of epichlorohydrin over a period of 45 minutes. The reaction was stirred for 2 hours. The pH of the product was 7.0 (moist pHydrion® paper) and contained a precipitate of sodium chloride. To aid in filtration of the precipitate the product slurry was diluted with 1.5 liters of methyl ethyl ketone. The filtrate was stripped of methyl ethyl ketone at 50°-90° C. at 20 Torr for several hours. The resultant polyol product of the general formula:

$$H-(OCH_2CH_2)_{14}-OCH_2\overset{OH}{\overset{|}{C}}H-CH_2-O-(CH_2CH_2O)_{14}-H$$

on analysis by n.m.r. showed 3.05 meq. OH/g (theory 2.4) of hydroxyl.

EXAMPLE 4

Preparation of a Triol

In a 2 liter, 3 neck flask with a heating mantle, stirrer, thermometer and distillation head was mixed 900 g (1.5 mole) polyethylene glycol 600 MW and 1 mole of KOH in water. Most of the water distilled off as it was heated to 100° C. under vacuum. Most remaining water was stripped by heating the residue at 100° to 100° at 1 to 5 Torr for one hour. Epichlorohydrin, 83 g, 0.9 mole was added dropwise from a dropping funnel over one hour. Potassium chloride started to precipitate soon after the addition was started and the exothermic reaction raised the temperature from 100° to 110° C. The temperature was kept in this range for 2 hours after the addition was complete. The product was stripped but little or no epichlorohydrin remained.

The slurry was diluted with an equal volume of methanol and stirred overnight with about 10 g of decolorizing charcoal. The solution was filtered and separated into two fractions. One was passed through a column of Amberlyst 15 ion exchange resin (acid form). The other was passed through a column of Dowex 50WX8 ion exchange resin. When the solvent was stripped from both samples, salt precipitated from them indating that alcohols are not useful solvents for this purpose. They were redissolved in acetone, filtered and passed through acid regenerated ion exchange resins. The acetone was stripped. The first sample contained 2.38 to 2.43 milliequivalents of hydroxyl per gram (420 to 412 equivalent weight) and 0.01% water. The second contained 2.40 to 2.43 meq OH and 0.02% water. This product corresponds to triol (theory 2.39 milliequivalents of hydroxyl per gram).

The chain extended polyols of the instant invention can be capped with a polyisocyanate. Polyisocyanates operable herein to form prepolymers for making foams or hydrogels are of the formula $R-(NCO)_n$ wherein n is 2-4 and R is a polyvalent organic moiety having the valence of n. The polyisocyanate is reacted with the claim-extended polyol of the present invention in an amount ranging from stoichiometric up to a 20% excess per equivalent OH in the polyol. The prepolymer forming reaction is carried out at a temperature in the range 20°-100° C. preferably 30°-60° C. Although the reaction is operable under atmospheric conditions, it is preferably carried out in an inert, moisture free medium, e.g., under a nitrogen blanket. Suitable polyisocyanates useful in preparing this type of prepolymer include toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanatecyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylene diisocyanate, 1,4-tetramethylene diisocyanate, 1,10-decamethylene diisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenlenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilibene, 3,3'-dimethyl-4,4'-diisocyanatodiphenyl, 3,3'-dimethoxy-4,4'-diisocyanatodiphenyl, 4,4'-methylene bis(diphenylisocyanate), 4,4'-methylene bis(dicyclohexylisocyanate), 1,4-anthracenediisocyanate, 2,5-fluorenediisocyanate, 1,8-naphthalenediisocyanate and 2,6-diisocyanatobenzfuran.

Also suitable are aliphatic polyisocyanates such as the triisocyanate Desmodur N-100 sold by Mobay which is a biuret adduct of hexamethylenediisocyanate; the diisocyanate Hylene W sold by du Pont, which is 4,4'-dicyclohexylmethane diisocyanate; the diisocyanate IPDI or Isophorone Diisocyanate sold by Thorson Chemical Corp., which is 3-isocyanatomethyl-3,5,5-trimethylcyclohexyl isocyanate; or the diisocyanate THMDI sold by Verba-Chemie, which is a mixture of 2,2,4- and 2,4,4-isomers of trimethyl hexamethylene diisocyanate. Another technique to produce the prepolymer is to use a polyfunctional isocyanate having a functionality greater than 2 in combination with the chain-extended polyol. Suitable polyisocyanates useful in this technique include PAPI (a polyaryl polyisocyanate commercial product sold by the Upjohn Company as defined in U.S. Pat. No. 2,683,730), 2,4,6-toluenetriisocyanate and 4,4'4"-triphenylmethane triisocyanate.

The following examples show the making of an isocyanate capped prepolymer and a foam therefrom.

EXAMPLE 5

Preparation of Triisocyanate from the Triol

One kilogram of the triol from Example 1 (1.53 eq OH) was heated to 100°–110° C. at 15 Torr for one hour to remove any traces of water. The liquid was then cooled to 55° C. at one atm. and 2 g of benzoyl chloride were added to neutralize traces of sodium alkoxides which might induce unwanted condensations of isocyanates.

To the above liquid was added 353 g (2.04 m) of toluene diisocyanate (80/20 2,4–2,6 isomer mix). A slight exotherm occurred and the reaction was stirred at 60°–65° C. for 45 minutes. The reactants then stood at 25° C. for 16 hours to give an amber liquid, viscosity 7000 cps at 25° C., having an isocyanate content of 1.72 meq/g (theory 1.88 meq NCO/g) of the formula:

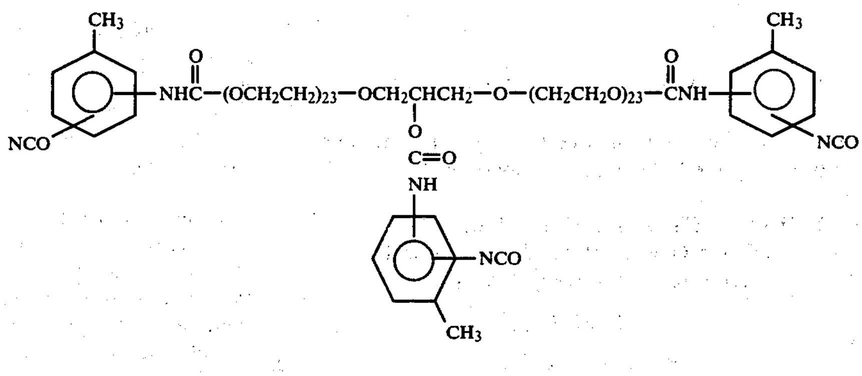

The resultant foam was very resilient.

EXAMPLE 6

Preparation of a Foam

To 80 g of an aqueous solution containing 2.0% Pluronic L-62 (a surfactant, commercially available from BASF-Wyandotte) in a quart cup was added 80 g of the isocyanate-capped, chain-extended polyol from Example 5. The mixture was stirred vigorously for 15 seconds and then allowed to foam.

What is claimed:

1. An isocyanate capped, urethane-containing prepolymer comprising the reaction product of (a) a polyol composition containing at least three OH groups of the general formula:

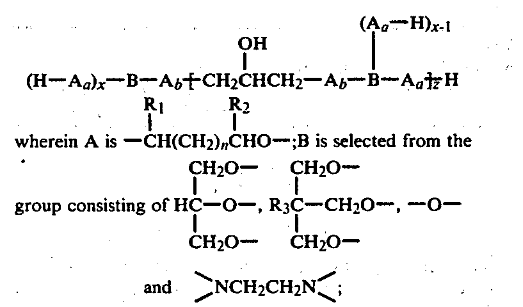

at least one of $R_1$ and $R_2$ is H and the other is independently selected from the group consisting of H, $CH_3$ and phenyl; $R_3$ is H, $CH_3$, $CH_2CH_3$ or $—OCH_2—$; n is 0 or 2; x is 1–3; z is 1–10 and a and b are independently selected from 1 to 1000 and from a stoichiometric amount up to a 20% excess per equivalent OH in the polyol of (b) a polyisocyanate containing at least two NCO groups.

2. An isocyanate capped, urethane-containing prepolymer of the formula:

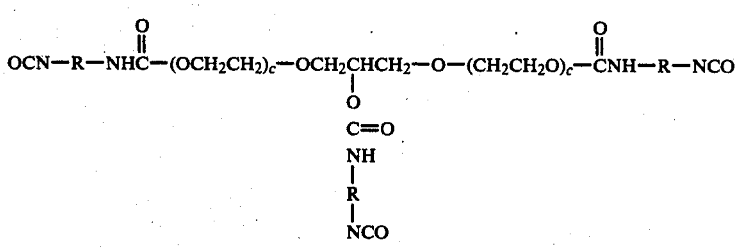
wherein R is a divalent organic moiety and c is 2–2,000.
3. A prepolymer according to claim 2 of the formula:
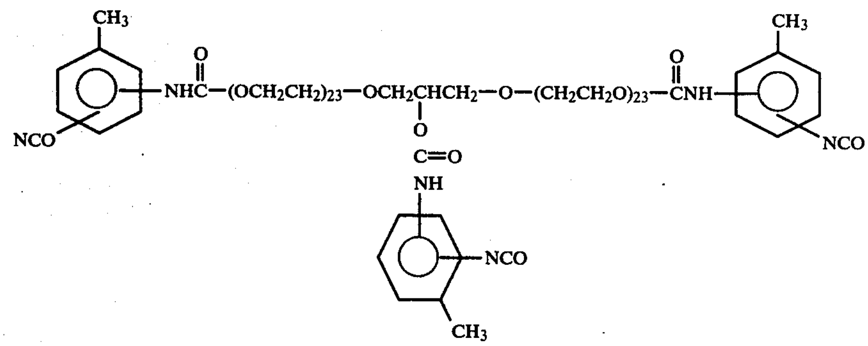
* * * * *